Jan. 6, 1931.  K. M. WISE  1,787,711
STEERING MECHANISM
Filed March 22, 1928

INVENTOR.
Earl M. Wise
BY
ATTORNEY

Patented Jan. 6, 1931

1,787,711

UNITED STATES PATENT OFFICE

KARL M. WISE, OF SOUTH BEND, INDIANA, ASSIGNOR TO THE STUDEBAKER CORPORATION, OF SOUTH BEND, INDIANA, A CORPORATION OF NEW JERSEY

STEERING MECHANISM

Application filed March 22, 1928. Serial No. 263,868.

This invention relates to motor vehicles and particularly to the steering mechanism therefor.

It is a well known fact that the steering of a motor vehicle is affected to a great extent by the movement of the vehicle front axle. In conventional constructions the front end of each semi-elliptic front spring is pivoted to the forward end of the vehicle frame side member and the rear end thereof is shackled to the frame rearwardly of the spring horn. In these conventional constructions the end of the steering arm which moves the front wheels is positioned directly over the front axle and is connected by a rearwardly-extending drag link to the steering gear lever. The axle moves upwardly and forwardly with the movement of the spring in an arc about the connection between the front ends of the spring and axle as an axis. This movement of the axle also causes the forward end of the drag link to move upwardly, but instead of moving forwardly it moves rearwardly because the drag link swings about the connection with the steering gear lever as an axis. This upward and rearward movement of the forward end of the drag link causes the steering arm to move, with the result that the vehicle is inadvertently steered to the right.

When a vehicle equipped in this manner with the conventional steering mechanism, is operated over rough and uneven roads it has a tendency to be continuously steered to the right, which causes the vehicle to sway from side to side. This hinders the steering of the vehicle and is of great inconvenience to the driver of the same. It is therefore, the principal object of this invention, to provide a motor vehicle with a steering mechanism which decreases the amount of inadvertent steering caused by the movement of the axle with the vehicle springs.

Another object is to provide a motor vehicle with a front spring shackled at its forward end to the frame spring horn and a steering drag link pivoted at its rearward end to a portion of the steering mechanism positioned forwardly of the spring rear hanger whereby the arcs of movement of the drag link and axle are in the same general direction in order to limit the amount of inadvertent steering of the vehicle.

These being among the objects of the present invention the same consists of certain features of construction and combinations of parts to be hereinafter described with reference to the accompanying drawing and then claimed, having the above and other objects in view.

Figure 1:
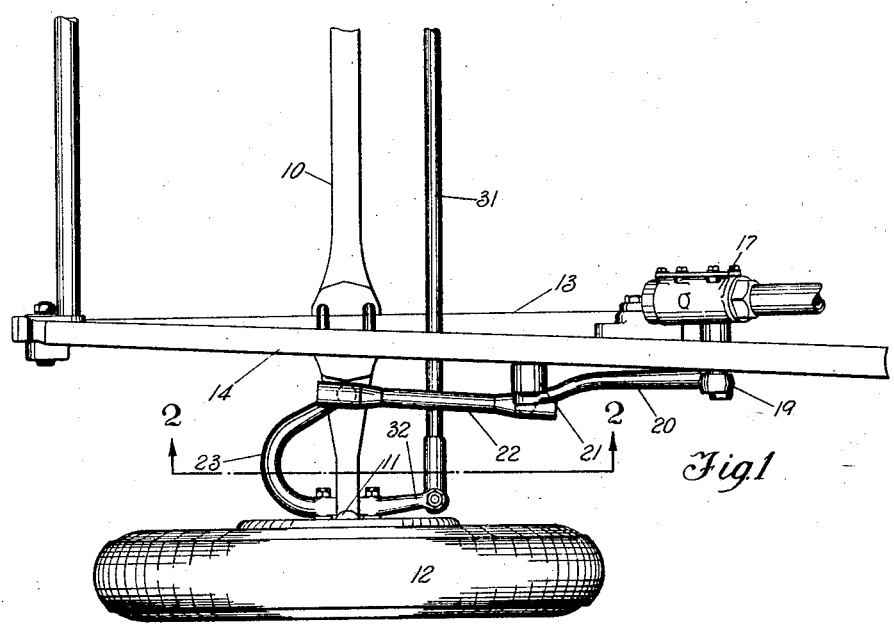

In the accompanying drawing which illustrates a suitable embodiment of the present invention, Figure 1 is a plan view of a portion of the forward end of the motor vehicle chassis showing the same equipped with means for reducing the amount of inadvertent steering.

Figure 2:
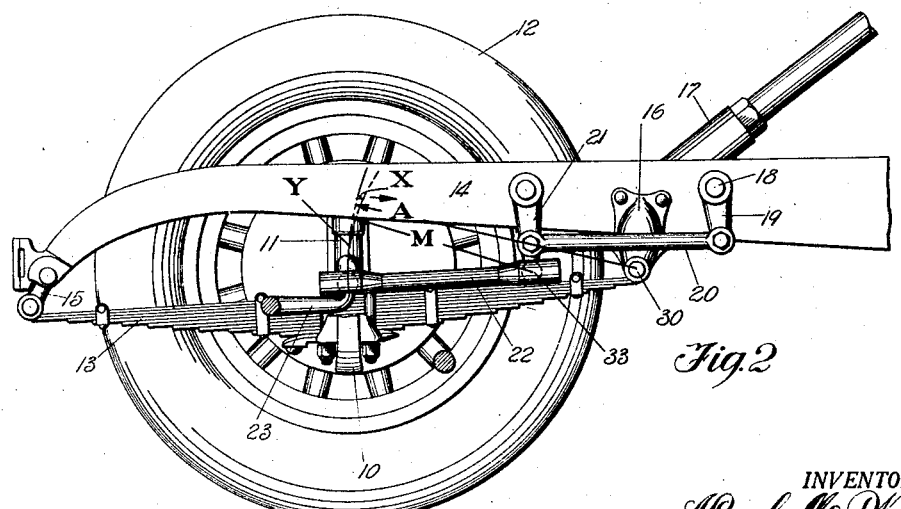

Figure 2 is a section taken approximately on the line 2—2 of Figure 1 showing the steering means in detail.

Referring to the accompanying drawing in which like numerals refer to like parts throughout the several views, the forward end of the vehicle frame 14 is supported on the front axle 10 by means of a pair of semi-elliptic springs 13 secured intermediate their ends to the axle 10 near the ends thereof. These springs 13 have their rear ends pivoted at 30 to frame hanger brackets 16 which are rigidly secured to the frame side rails 14 rearwardly of the axle 10, and have their forward ends pivoted to shackle links 15 which, in turn, are pivoted to the extreme forward ends of the frame side rails 14. The shackle links 15 serve as toggles which allow the axle 10 to swing in an arc having a radius "A" about the pivoted connection 30 of the rear ends of the springs 13.

Conventional steering knuckles 11 are hinged to the extreme ends of the axle 10 and are provided with outwardly extending stub axles (not shown) upon which the vehicle road wheels 12 are rotatably mounted. The wheels 12 are interconnected by a cross tube 31 pivoted to the free ends of projecting arms 32 secured to the steering knuckles 11. The construction just described is of conventional construction. As both sides of this portion of the construction are identical only one-half of the same is shown in Figure 1 even though it has been described in its entirety.

Steering effort is applied to the wheels 12 by an arm 23 secured at one end to one of the steering knuckles 11. The other end of this arm 23 terminates in a ball end positioned directly over the longitudinal axis of the axle 10. It is believed that steering effort has never been applied to the steering arm 23 in the method which is about to be described, that is, by a method which takes into consideration the swinging movements of the axle with the ultimate aim of substantially eliminating inadvertent steering of the vehicle wheels 12.

The steering gear 17 like in all conventional constructions, is secured to one of the frame side rails 14 as shown in Figure 2 and the outwardly projecting shaft 18 thereof projects through the frame side rail 14 rearwardly of the spring rear hanger 16. A depending lever 21 is pivoted to the frame side rail 14 forwardly of the spring rear hanger 16 and is pivotally connected by a rod 20 to a lever 19 which is rigidly secured to and rotated by the steering gear shaft 18. The lower end of the lever 21 is formed with a ball end which, when in normal position, is substantially in the horizontal plane of the pivoted rear end of the spring 13. A drag link 23 connects the lever 21 with the steering arm 23 and has socket ends which receive the ball ends of these two members.

It will be noted in Figure 2 that when the axle 10 is swung through the arc "A" by the irregularities in the road over which the vehicle is driven that the forward end of the drag link 22 also swings through an arc having a radius "M" about the connection 33 with the ball end of the lever 21 as an axis. The arcs of movement of the axle 10 and drag link 22 are both in the same general direction. The distance between the arcs of movement of the axle 10 and drag link 22 is illustrated by the line "X" but this distance is taken at a point quite remote from the height that the axle 10 can possibly move. The construction of the frame 14 and spring 13 limits the swinging movement of the axle 10 so that it cannot move any higher than the point designated by "Y". It is to be noted at this point "Y" that the two arcs "A" and "M" substantially coincide and the distance that the vehicle will be inadvertently steered to the right is negligible.

If, however, the construction was similar to the conventional in which the spring 13 was fixedly pivoted to the front end of the frame member 14 and the rear end of the drag link 22 was pivoted directly to the steering lever 19, it can be readily understood that the arcs of movements of the axle 10 and drag link 22 would be in opposite directions. In the conventional construction the arcs of movement start to diverge from each other from the very beginning and by the time the axle 10 had reached the point "Y" during its swinging movement—the distance between the two arcs would be quite appreciable with the result that the vehicle would be steered to the right. This steering of the vehicle would be intermittent because of the irregularities of the road and the vehicle would sway from side to side making the same very hard to steer. It is readily seen that the present invention has many advantages which are not present in the conventional construction just described.

If the spring 13 was mounted on the frame 14 in the manner shown in Figure 2 and if the lever 21 were omitted and the drag link 22 secured directly to the steering lever 19 as in the other conventional construction many disadvantages would result. The arcs of movement of the axle and drag link would be in the same general direction but the arc of movement of the drag link 22 would have a greater radius than the arc of movement of the axle 10 with the result that the vehicle would be inadvertently steered to the left because by the time the axle 10 had moved to the point "Y" the distance between the arcs of movement at this point would be very appreciable.

From the foregoing description the advantages of the present invention are readily apparent as it can be seen that it is very advantageous to have a motor vehicle provided with means such that inadvertent steering of the same will not be produced by irregularities in the road over which it travels. Hazards of driving are therefore eliminated.

It is to be understood however, that formal changes may be made in the specific embodiment of the invention described without departing from the spirit and substance of the broad invention, the scope of which is commensurate with the appended claims.

What I claim is:

1. The combination with the frame and front axle of a motor vehicle, of springs secured on said axle and pivotally mounted at their rear ends to said frame to permit swinging movement of said axle rearwardly of its normal position about said ends as axes, steering knuckles pivotally mounted adjacent to the ends of said axle, a steering arm secured to one of said knuckles having its free end terminating above the longitudinal axis of said axle, a lever pivoted to said frame forwardly of the rear ends of said springs, a drag link pivoted at one end to the free end of said steering arm and pivoted at its other end to said lever substantially in the horizontal plane of said pivotally mounted ends of said springs whereby the arc of movement of said drag link is in the same general direction as and is of lesser radius than the arc of movement of said axle, and means rearwardly of said lever for moving the same to steer said vehicle.

2. The combination with the frame and front axle of a motor vehicle, of springs secured to said axle intermediate their ends and pivotally mounted at their rear ends on said frame to permit swinging movement of said axle about said ends as axes, steering knuckles pivotally mounted adjacent to the ends of said axle, a steering arm secured to one of said knuckles having its free end extending forwardly of and terminating above the longitudinal axis of said axle, a lever pivoted on said frame forwardly of the rear ends of said springs, a drag link pivoted at one end to the free end of said steering arm and pivoted at its other end to said lever substantially in the horizontal plane of said pivotally mounted ends of said springs, a lever pivoted on said frame rearwardly of the rear ends of said springs, a link connecting said first and second named levers, and means for rocking said second lever to cause longitudinal movement of said link and cause said drag link to move in the same general direction as the pivoted end of said springs but having a lesser radius than the arc of movement of said axle.

Signed by me at South Bend, Indiana, this 14th day of March, 1928.

KARL M. WISE.